United States Patent [19]

Fourrey et al.

[11] Patent Number: 4,927,210
[45] Date of Patent: May 22, 1990

[54] SEAT WITH AN ADJUSTABLE FOLD-DOWN BACK

[75] Inventors: Francois Fourrey, Montbeliard; Jean F. Mauffrey, Andelnans, both of France

[73] Assignee: ECIA - Equipements Et Composants Pour L'Industrie Aubomobile, Audincourt, France

[21] Appl. No.: 337,695

[22] Filed: Apr. 13, 1989

[30] Foreign Application Priority Data

Apr. 22, 1988 [FR] France ................... 88 05396

[51] Int. Cl.$^5$ ............................................. A47C 1/025
[52] U.S. Cl. ....................................... 297/366; 397/355
[58] Field of Search ............... 297/378, 366, 379, 357, 297/370, 371

[56] References Cited

U.S. PATENT DOCUMENTS

| | | | |
|---|---|---|---|
| 3,736,025 | 5/1973 | Ziegler et al. | 297/379 |
| 3,866,270 | 2/1975 | Suzuki et al. | 297/379 |
| 4,629,252 | 12/1986 | Myers et al. | 297/366 |

FOREIGN PATENT DOCUMENTS 1185088  3/1970  United Kingdom ................ 297/378

Primary Examiner—Peter A. Aschenbrenner
Attorney, Agent, or Firm—Sughrue, Mion, Zinn, Macpeak & Seas

[57] ABSTRACT

A sitting-surface frame (10) and a backframe (1) are connected to one another, on each side of the seat, at two mutually spaced points, one comprising a tilting axle (34) and the other a folding-down axle (8). Each lateral branch (11) of the backframe has a serrated slot (4) engaged with a folding-down axle (8) fixed to the sitting surface and carries a tilting axle (34). The axle (34) is integral with a releasing lever (32) retained on the end of the sitting surface. The pivoting of the lever in one direction frees the tilting axle and allows the back to be folded down about the axle (8), while in the other direction it lifts the back, disengages the serrations (6) of the slot and makes it possible to change the inclination of the back.

14 Claims, 3 Drawing Sheets

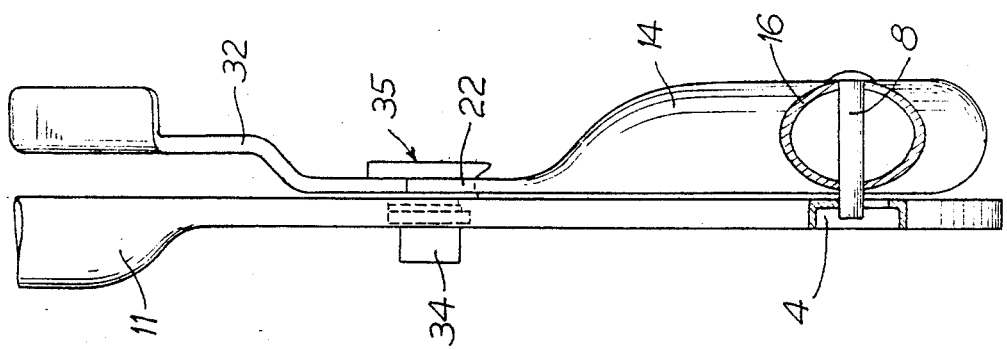
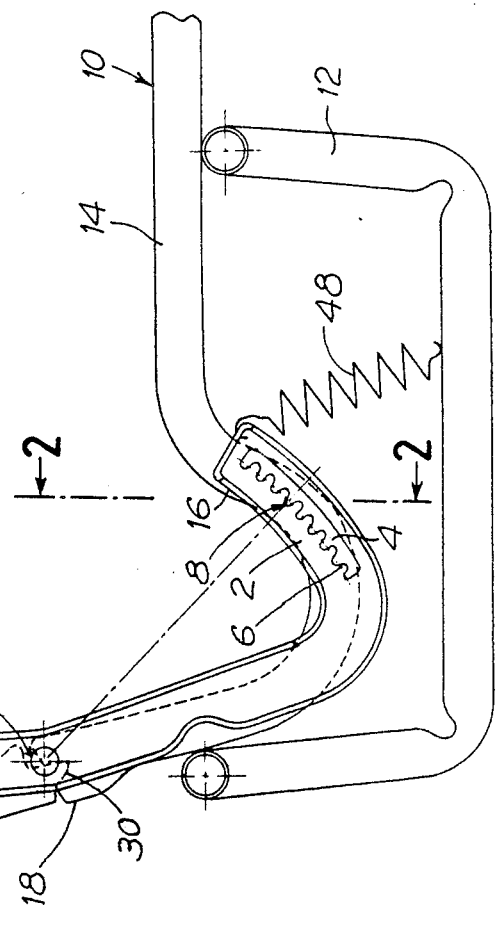

U.S. Patent May 22, 1990 Sheet 2 of 3 4,927,210
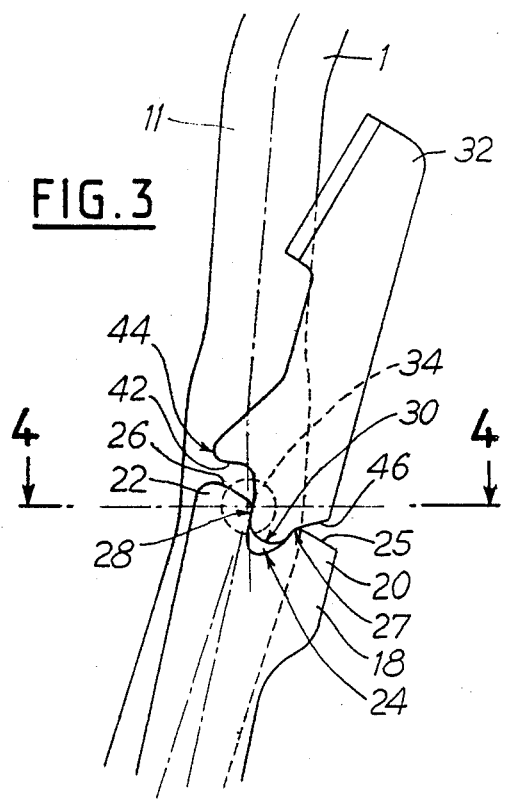
FIG.3
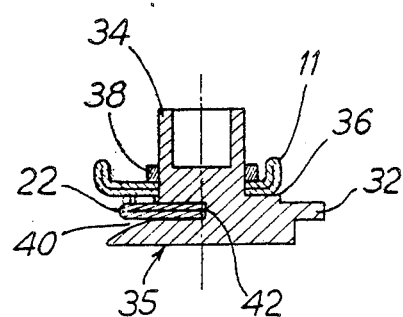
FIG.4
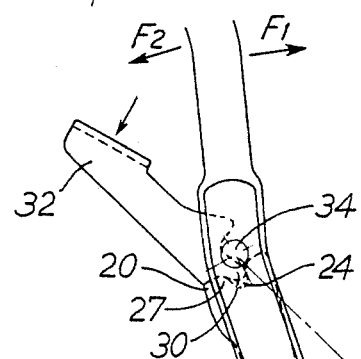
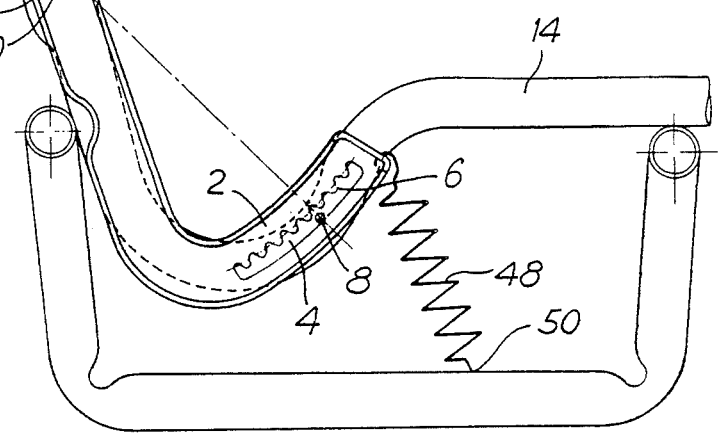
FIG.5

SEAT WITH AN ADJUSTABLE FOLD-DOWN BACK

BACKGROUND OF THE INVENTION

Since the comfort of passengers and the saving of space are constant preoccupations of the manufacturers of vehicles, especially motor vehicles, there are many types of seats of which the back can be folded down onto the sitting surface, and it is increasingly desirable that there should also be the possibility of adjusting the inclination of this back during use, in order to ensure that the user is truly comfortable.

However, it can be seen that the devices allowing this adjustment of inclination are complex and mostly employ an auxiliary pivoting mechanism which comprises numerous components and which is therefore costly.

SUMMARY OF THE INVENTION

The object of the present invention is to overcome these disadvantages by providing a seat of which the back can be both adjusted and folded down, but which is produced in an especially simple way, is of absolute reliability and has a relatively low cost price.

In fact, the subject of this invention is a seat comprising a backframe and a sitting-surface frame which are connected to one another by means of two mutually spaced axles, namely a tilting axle and a folding-down axle, fixed to one of the frames and locked on the other, and means for releasing each of these axles for the purpose of pivoting the back about the other.

According to a preferred embodiment, the backframe has a serrated slot engaged on a folding-down axle fixed to the sitting-surface frame and carries a tilting axle which is locked on the end of the sitting-surface frame.

The releasing means consist of a releasing lever integral with the tilting axle and having a finger intended for retention in a notch of the end of the sitting surface and offset relative to the tilting axle.

As a result of this arrangement, the pivoting of the releasing lever in one direction makes the retention finger rock in the notch, causes a lifting of the tilting axle and of the backframe as a whole and frees the latter from the folding-down axle, thus allowing it to assume the desired inclination. Conversely, a pivoting of the releasing lever in the opposite direction causes the retention finger to come out of the notch and frees the tilting axle, so that the back can be folded down onto the sitting surface. The frames thus themselves form the means for guiding the pivoting of the back, thus avoiding the need to use auxiliary devices.

According to a preferred embodiment, the sitting-surface frame and the backframe each comprise a U-shaped tube, the lateral branches of which are bent upwards at their end, the lateral branches of the backframe also being flattened, starting from the tilting axle. Production is further simplified, whilst the rigidity of the seat is increased.

Moreover, the following description of an embodiment, given as a non-limiting example and illustrated in the accompanying drawings, will highlight the advantages and characteristics of the invention. In these drawings:

BRIEF DESCRIPTION OF THE DRAWINGS

FIG. 1 is a diagrammatic side view of a seat according to the invention in the position of use.

FIG. 2 is a sectional view along the line 2—2 of FIG. 1.

FIG. 3 is a partial view on a larger scale, taken from the side opposite that of FIG. 1 and showing the connection between the releasing lever and the sitting-surface frame.

FIG. 4 is a sectional view along the line 4—4 of FIG. 3.

FIG. 5 is a view, similar to that of FIG. 1, of the seat in the position for adjustment of the inclination of the back.

DETAILED DESCRIPTION OF THE PREFERRED EMBODIMENT

Figure 7:
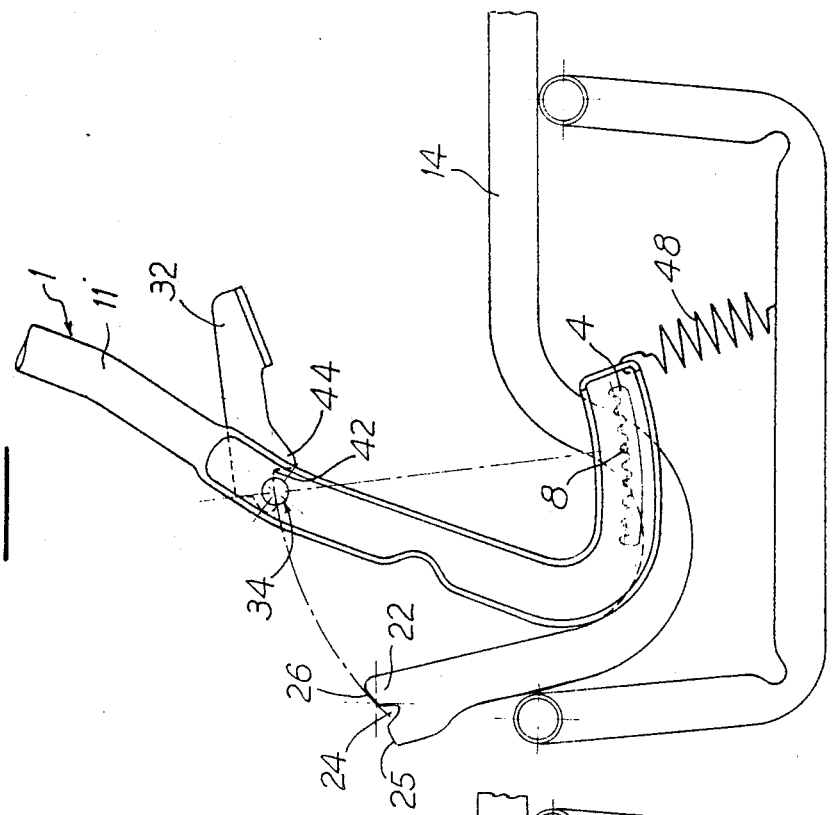
FIGS. 6 and 7 are views, similar to that of FIG. 5, of the released seat before and after the folding down of the back onto the sitting surface respectively.

The seat which is the subject of the invention comprises a backframe 1 preferably formed by an element bent in a U-shaped manner, the lateral branches 11 of which are flattened in their lower part. These lower parts are also curved upwards and forwards, so that each of the lateral branches of the frame 1 terminates in an upwardly directed flat portion 2. This end portion 2 has an elongate and slightly curved longitudinal slot 4, the upper edge of which has rounded teeth 6, between two of which is engaged an axle 8 fixed to a sitting-surface frame 10.

This sitting-surface frame 10 possesses, above a base or mounting 12, two lateral arms 14 which, towards the rear of the seat, are curved downwards and then upwards so as to have a form closely resembling that of the flattened portion of the adjacent lateral branch 11 of the backframe. The axle 8 thus passes through a descending portion 16 of the corresponding branch 14.

Furthermore, each of the branches 14 terminates in a flattened and slightly widened portion 18 which forms two flat lugs, 20 and 22 respectively, separated by a notch 24 and terminating in bearing surfaces 25 and 26 respectively. These two bearing surfaces are inclined downwards, and preferably the front bearing surface 26 is slightly curved and centred on the axle 8. The central notch 24 is widened outwards and is joined to each of the bearing surfaces 25 and 26 by means of a rounded angle 27 and 28 respectively (FIG. 3).

Engaged in the notch 24 is a flat finger 30 which is formed at the end of a releasing lever 32 integral with an axle 34 passing through the branch 11 of the frame 1. In fact, near the finger 30, the lever 32 has a boss 35 (FIG. 4), from which the axle 34 starts and which forms a washer 36, against which the branch 11 of the frame 1 is retained axially by means of a washer 38, whilst at the same time being free to rotate relative to the axle 34. The boss 35 also possesses a notch 40, into which engages the lug 22 of the sitting-surface frame when the seat is in the position of use. The bottom 42 of the notch 40 constitutes an extension of the lateral face of the finger 30 which has a form substantially matching that of the edge of the lug 22 and which constitutes the lower face of a nose 44 projecting laterally on the lever 32. The finger 30, on its other side, is extended by a plane face 46 inclined upwards, that is to say in the opposite direction to the bearing surface 25.

The flat finger 30 is thus offset relative to the tilting axle 34 of the releasing lever 32. However, it is strictly immobilized in the notch 24 when this lever is in the raised position, shown in FIGS. 1 and 3, because of its contact with the two lugs 20 and 22, the action of the weight of the back 1 tending to press it into the notch 24 and the action of the restoring spring 48.

However, when the user wishes to change the inclination of the back 1, it is sufficient for him to cause the releasing lever 32 to pivot towards the rear of the seat, as shown in FIG. 5. This pivoting lays the lever onto the rounded angle 27 of the lug 20 and makes it pivot about this angle, in such a way that the face 46 comes to bear on the bearing surface 25, whilst the finger 30 rocks in the notch 24 and causes a lifting of the axle 34 which moves outwards away from its initial position, and the notch 40 slides on the lug 22, but maintains the connection between the two frames. The axle 34, in its movement, takes with it the backframe 1 and consequently the upwardly curved flattened portion 2, the slot 4 and particularly the toothing 6. This toothing disengages from the axle 8, so that the back is no longer connected to the sitting-surface frame 10 by means of this axle 8. The user can then shift the upper part of the frame 1 forwards or rearwards, that is to say according to the arrow F1 or the arrow F2 of FIG. 5, in order to change the inclination of the back in relation to the sitting surface and especially to move the toothing 6 relative to the axle 8 about the axle 34 which performs the function of a tilting axle.

When the desired position has been reached, the lever 32 is returned to its initial position, that is to say it pivots in the opposite direction about the rounded angle 27, until, when the notch 40 has slid over the lug 22 of the sitting surface, the finger 30 is once again retained in the notch 24. At this moment, the axle 34 has descended again and the toothing 6 has engaged onto the axle 8, although the latter is not between the same teeth as before. Moreover, this return to the locked position becomes easier as a result of the action of a spring 48 which is mounted between the end of the curved portion 2 of the backframe 1 and a fixed point 50 of the supporting cradle 12 of the sitting surface and which at any moment tends to return the end of the backframe downwards, that is to say the toothing 6 into its position of engagement on the axle 8.

Figure 6:
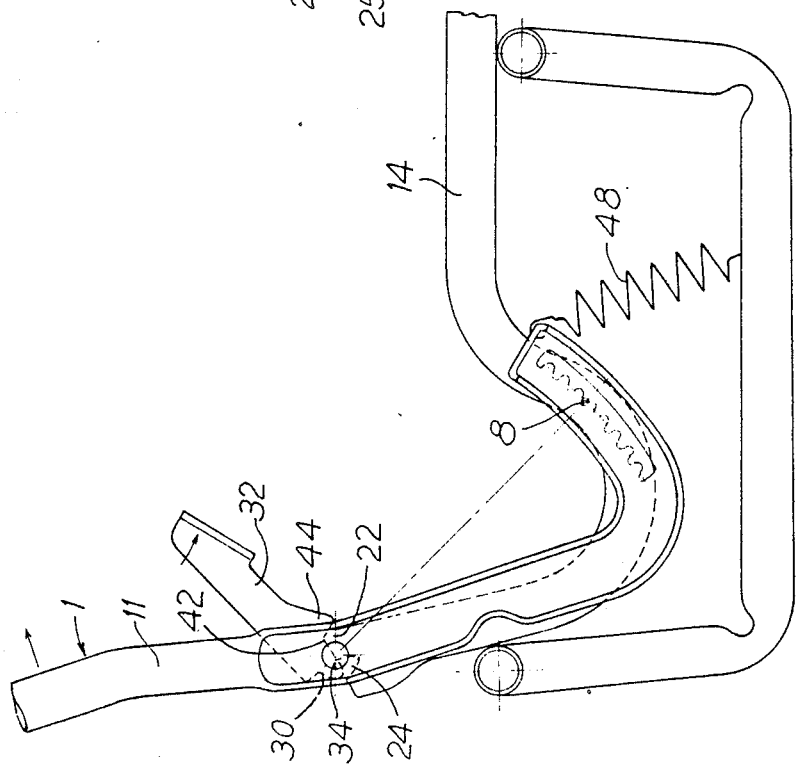

Furthermore, if it is necessary to increase the space available behind the seat and therefore fold the back 1 down, the releasing lever 32 is pushed forwards, as shown in FIG. 6. It then pivots, together with the axle 34, in relation to the backframe 1, in such a way that its profiled face 42 engages onto the edge of the lug 22 of the sitting-surface frame, whilst the finger 30 comes out of the notch 24, thus breaking the connection between the sitting surface and the back at this point. Because the nose 44 comes to bear on the front edge of the lug 22 of the sitting surface, no rearward movement of the back is possible. In contrast, force simply exerted forwards on the upper part of the backframe 1 is sufficient to cause the latter to pivot about the axle 8 which performs the function of a folding-down axle. The seat then assumes the position shown in FIG. 7.

The back 1 is returned to the normal position by pivoting the frame 1 about the axle 8 in the opposite direction, the profiled face 42 once again engaging on the bearing surface 26 of the lug 22, particularly because this bearing surface is centred on the axle 8. When the nose 44 is once more in contact with the lug 22, the lever 32 can be raised in order to retain the finger 30 once again in the notch 24. The seat resumes its locked position.

This operation, like the preceding one, is therefore carried out extremely simply without the need for a special external mechanism, purely by virtue of the form of the sitting-surface and backframes. The control of the inclination of the back and that of its folding down thus have an especially small bulk, although they are of unfailing reliability, so that the seat obtained is extremely resistant, especially comfortable and inexpensive.

Of course, the lateral branches of the backframe, like those of the sitting-surface frame, are formed in an identical way, a folding-down axle 8 and the slot 4 being provided on each of the sides of the seat. Likewise, a tilting axle 34, a retention finger 30 and a boss 35 are mounted on each of the lateral branches 11 of the backframe 1, so as to interact with two identical notches 24 of the sitting-surface frame. It is nevertheless generally preferable to use only a single release control lever 32 integral with one of the bosses 35 and connect the two axles 34 to one another by means of a transverse rod. The two sides of the seat are thus shifted simultaneously and pivot together about the tilting axle 34 of the folding-down axle 8.

What is claimed is:

1. Seat with an adjustable fold-down back, characterized in that it comprises a backframe (1) and a sitting-surface frame (10) which are connected to one another by means of two mutually spaced axles which provide for relative movement between said backframe (1) and said sitting-surface frame (10), said two axles comprising a tilting first axle (34) and a folding-down second axle which are fixed to one of the frames (1, 10) and locked on the other frame (10, 1), and means (32) for releasing each of said two axles for the purpose of pivoting the back about the other of said two axles.

2. Seat according to claim 1, characterized in that the backframe (1) has a slot (4) equipped with a toothing (6) engaged on a folding-down axle (8) fixed to the sitting-surface frame and carries a tilting axle (34) locked on the end (18) of the sitting-surface frame.

3. Seat according to claim 2, characterized in that the means (32) for releasing the axles comprise a releasing lever which is integral with the tilting axle (34) and which has a finger (30) for retention in a notch (24) of the end (18) of the sitting-surface frame, this finger being offset relative to the tilting axle (34).

4. Seat according to claim 3, characterized in that the retention finger (30) is capable of pivoting in a notch (24) about one edge of this notch, at the same time taking with it the tilting axle (34) and freeing the toothing (6) from the folding-down axle (8).

5. Seat according to claim 4, characterized in that the releasing lever (32) and the retention finger (30) rotate, together with the tilting axle (34), between the position of retention of the finger in the notch and a position of disengagement of this finger and of the release of the backframe relative to the end of the sitting-surface frame for the purpose of folding it down.

6. Seat according to claim 2 to characterized in that the slot (4) in the backframe is curved and centred on the tilting axle (34).

7. Seat according to claim 6, characterized in that the backframe (1) comprises lateral branches (11) which are curved forwards and upwards in their lower part (2), the serrated slot (4) being made in this curved part.

8. Seat according to claim 7, characterized in that the sitting-surface frame (10) comprises lateral branches (14) which are curved downwards and then upwards at their rear end and which terminate in a flattened portion

(18) forming two flat lugs (20, 22) on either side of a notch (24).

9. Seat according to claim 8, characterized in that the backframe (1) and sitting-surface frame (10) are formed by tubes flattened at their end, the lateral branches (11) of the backframe being flattened between the axles (34, 8) connecting it to the sitting-surface frame.

10. Seat according to claim 9, characterized in that it possesses a restoring spring (48) between the end of the backframe (1) and a fixed point (50) of the base.

11. Seat according to claim 8, characterized in that the releasing lever possesses, on either side of the retention finger (30), profiled faces (42, 46) of a form substantially matching that of the lugs (20, 22) of the end of the sitting-surface frame.

12. Seat according to claim 11, characterized in that the releasing lever (32) possesses a boss (35), from which starts the tilting axle (34) passing through the backframe (1) and which has a notch (40) for receiving the end (18) of the sitting-surface frame.

13. Seat according to claim 1, characterized in that the backframe (1) and the sitting-surface frame (10) comprise two lateral branches (11-14) formed in an identical way, the tilting axles (34) of the two sides being connected to one another by means of a transverse rod, and the release means comprising a single releasing lever (32) integral with the tilting axle (34).

14. A seat comprising:
- a back frame (1) with two lateral branches (11);
- a sitting-surface frame (10) with two lateral arms (14);
- a folding-down first axle (8) connecting together each of said corresponding lateral branch (11) and arm (14);
- a tilting second axle (34) connecting together each of said corresponding branch (11) and arm (14);

wherein said first and second axles (8, 34) are:
- spaced from one another by a distance having a first end value, for folding about said first axle (8), and a second value, greater than said first value, for tilting about said second axle (34);
- fixed to said two branches (11) or two arms (14); and adapted to be locked to said two arms (14) or branches (11); and means (32) mounted on said branches (11) and cooperating with said arms (14), and movable between an intermediate position and two opposite end first and second positions, for selectively locking and unlocking said frames (1, 10) relative to each other;

wherein:
in its intermediate position said means (32) locks said frames (1, 10);

in its first end position said means (32) unlocks said second axle (34) in order to permit pivoting the back frame (1) toward the sitting surface frame (10) about said second axle (34); and in its second position said means (32) unlocks from said first axle (8) by giving said distance its second value in order to permit pivoting both said frames (1, 10) about said first axle (8).